United States Patent
Dauwels et al.

(10) Patent No.: US 9,025,881 B2
(45) Date of Patent: May 5, 2015

(54) METHODS AND APPARATUS FOR RECOVERING PHASE AND AMPLITUDE FROM INTENSITY IMAGES

(71) Applicant: Nanyang Technological University, Singapore (SG)

(72) Inventors: Justin Dauwels, Singapore (SG); Jingshan Zhong, Singapore (SG)

(73) Assignee: Nanyang Technological University, Singapore (SG)

(*) Notice: Subject to any disclaimer, the term of this patent is extended or adjusted under 35 U.S.C. 154(b) by 173 days.

(21) Appl. No.: 13/760,790

(22) Filed: Feb. 6, 2013

(65) Prior Publication Data

US 2013/0202151 A1 Aug. 8, 2013

Related U.S. Application Data

(60) Provisional application No. 61/595,475, filed on Feb. 6, 2012.

(51) Int. Cl.
| | | |
|---|---|---|
| G06K 9/00 | (2006.01) |
| G02B 27/50 | (2006.01) |
| G03B 13/32 | (2006.01) |
| G06T 7/00 | (2006.01) |

(52) U.S. Cl.
CPC ..... *G06T 7/0002* (2013.01); *G06T 2207/10016* (2013.01); *G06T 2207/20056* (2013.01); *G06T 2207/20076* (2013.01); *G06T 2207/30024* (2013.01)

(58) Field of Classification Search
CPC ..... G06K 9/745; G06K 9/76; G06K 15/1285; G02B 27/40; G02B 27/52; G03B 13/32; G03B 13/36; H04N 5/23212; G01J 9/00; G03H 2001/0458
USPC .................................... 382/191, 255; 359/11
See application file for complete search history.

(56) References Cited

U.S. PATENT DOCUMENTS

| | | | |
|---|---|---|---|
| 6,525,875 B1* | 2/2003 | Lauer | 359/371 |
| 8,184,298 B2* | 5/2012 | Popescu et al. | 356/450 |
| 8,704,941 B2* | 4/2014 | Takeuchi | 348/350 |
| 2006/0060781 A1* | 3/2006 | Watanabe et al. | 250/310 |

OTHER PUBLICATIONS

Waller, et al. "Phase and amplitude imaging from noisy images by Kalman filtering." Optics Express. 19.3 (2011): 2805-2815. Print.*
Chessa, et al. "Phase measurements without interferometry: 2D transverse phase detection by numerical beam intensity analysis." Laser and Particle Beams. 17.4 (1999): 681-692. Print.*

(Continued)

*Primary Examiner* — Michael A Newman
(74) *Attorney, Agent, or Firm* — Sughrue Mion, PLLC

(57) ABSTRACT

An intensity image is collected at each of a plurality of locations spaced apart in a propagation direction of a light beam. Information from the intensity images is combined using a Kalman filter which assumes that at least one co-variance matrix has a diagonal form. This leads to considerable reduction in computational complexity. An augmented Kalman filter model (augmented space state model) is used in place of the standard Kalman filter model. The augmented Kalman filter improves the robustness to noise.

8 Claims, 4 Drawing Sheets
(2 of 4 Drawing Sheet(s) Filed in Color)

(56) References Cited

OTHER PUBLICATIONS

Gureyev, et al. "Rapid quantitative phase imaging using the transport of intensity equation." Optics Communications. 133. (1997): 339-346. Print.*

Dean, et al. "Phase Retrieval Algorithm for JWST Flight and Testbed Telescope." Proc. of SPIE Space Telescopes and Instrumentation I: Optical, Infrared and Millimeter. 6265. (2006): 626511 (1-17). Print.*

Brady, et al. "Nonlinear optimization algorithm for retrieving the full complex pupil function." Optics Express. 14.2 (2006): 474-486. Print.*

Patil, et al. "Subspace-based method for phase retrieval in interferometry." Optics Express. 13.4 (2005): 1240-1248. Print.*

Misell, et al. "A method for the solution of the phase problem in electron microscopy." J. Phys. D: Appl. Phys.. 6. (1973): L6-L9. Print.* van Dam, et al. "Theoretical performance of phase retrieval on a subdivided aperture." Opt. Eng.. 41.6 (2002): 1387-1395. Print.*

Vogel, et al. "Fast Algorithms for Phase Diversity-Based Blind Deconvolution." Proc. SPIE 3353, Adaptive Optical System Technologies. 3353. (1998): 1-12. Print.*

* cited by examiner

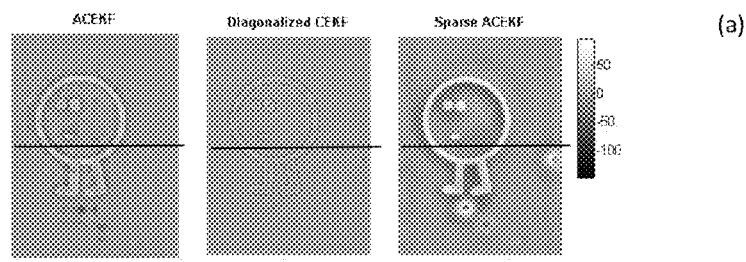
(a)
Fig. 6
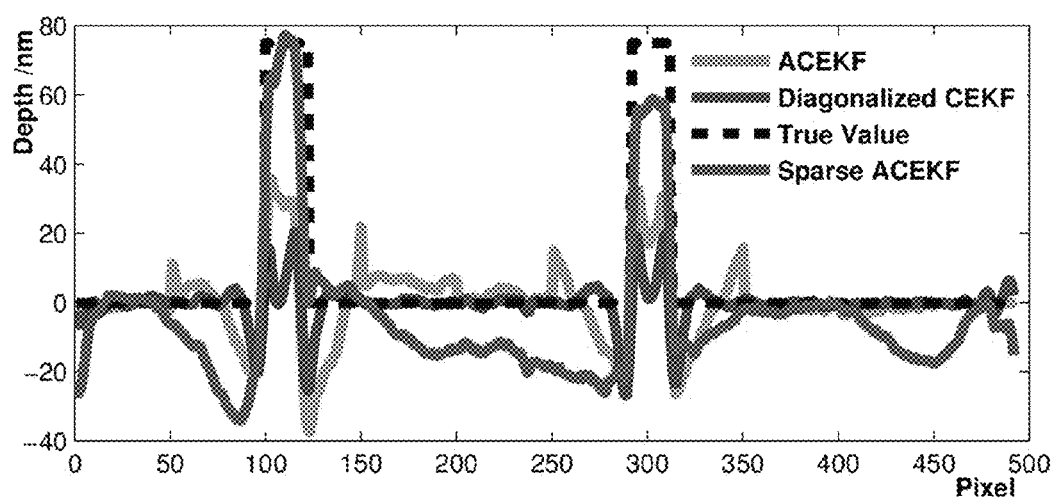
(b)

METHODS AND APPARATUS FOR RECOVERING PHASE AND AMPLITUDE FROM INTENSITY IMAGES

FIELD OF THE INVENTION

The present invention relates to methods and apparatus to obtain phase information characterizing light, using a plurality of images encoding information about the intensity of the light.

BACKGROUND OF THE INVENTION

When coherent (laser) light passes through or reflects from an object, its amplitude and phase are altered as it continues to propagate. Phase perturbations contain important information about an object. For example, transparent biological cells are invisible in a focused microscope, but impart distinct phase changes. Data about these phase changes can find useful applications in morphology analysis of cell, or cell-cycle analysis without labelling. Such applications are relevant for biology and biomedical engineering, e.g., for detecting cancer cells. Moreover, there are various applications in materials science.

It is noteworthy that only the intensity of light can be measured directly, since phase oscillates far too quickly, and therefore, the phase needs to be reconstructed computationally. This "phase problem" of optical imaging has been around for decades, but only recently has been posed as an inference problem [1, 2]. This breakthrough, in principle, allows for much more experimental noise in the images, and as a consequence, enables applications of phase imaging where there is little light and much background noise (e.g., underwater imaging).

Traditional methods for phase recovery include phase contrast microscopy, differential interference contrast microscopy, and digital holography [3,4,5]. All of the three methods use a reference wavefront to obtain the amplitude and phase information. The phase image recovered by phase contrast microscopy is a function of the optical path length magnitude of the object. Differential interference contrast microscopy obtains the gradients of the optical length, but it can only be used when the object has a similar refractive index to the surroundings. Digital holography uses an interferometer setup to record the interference between a reference beam and a beam which has interacted with an object to be imaged. A computer is used to calculate the object image with a numerical reconstruction algorithm. So digital holography has the advantage of giving quantifiable information about optical distance, while phase contrast microscopy and differential interference contrast microscopy just provide a distorting of the bright field image with phase shift information. However, the experimental setup for digital holography is usually complicated, and has high requirements on the wave path [6,7]. For instance, the reference beam and target beam need to be accurately aligned.

An alternative approach is based on exploiting the physics of wavefront propagation. Consider the experimental arrangement shown in FIG. 1, which is taken from [1]. A laser 1 generates a beam 2 of light, which propagates in a direction z and passes through a collimator 3, and a lens 4. An object to be imaged can be placed in the object plane 5, such that the light beam passes through it. The light then passes through a further pair of lenses lens 6, 7 forming a "4f system", and the light then passes into a camera 8 which collects an intensity image of the light reaching it in the propagation direction z. The 4f system has the effect of enlarging the beam (which is important if the object which was imaged is small, such as a cell) and of making it clear where the position of the object plane is in relation to the focal plane of the lenses 6, 7 (this information is important, so that it is possible to propagate the complex plane back into the object plane) The camera 8 or the object 5 can be moved parallel to the light propagation direction, and collects a plurality of two-dimensional intensity images 9 at respective locations spaced apart in this direction. Each intensity image shows the light intensity at respective points in a two-dimensional plane (x,y) perpendicular to the light propagation direction z. Note that the distance by which the camera or object 5 is moved is very small (of the order of 10-100 micrometers) so there is no collision with the lenses. The focal plane is determined by the focal length of the lenses 6, 7 in the 4f system. The complex field at the focal plane is an enlarged or reduced version of the complex field at the object plane 5, so recovering the complex field at the focal plane is the same as recovering the complex field at the plane 5. At the focal plane, the intensity image 9a contains no information about the phase.

The object to be imaged, which is placed at the object plane 5, modifies the light passing through it, producing, at each point in the object plane 5, a corresponding amplitude contrast and phase difference. In example, the phase difference produced by the object at each point in the 2-D object plane is as shown as 10a in FIG. 1, where the level of brightness indicates a corresponding phase difference. The amplitude contrast produced by the object in the object plane is shown as 10b (a moustache and hat). The amplitude contrast diffracts symmetrically through the focal point, while the phase defocuses in an anti-symmetric fashion. The phase and amplitude are estimated from the intensity images 9 captured by the camera 4 by a computational numerical algorithm.

One method for doing this is the Gerchberg-Saxton (GS) method [9.10], which treats the problem as convex optimization and iterates back and forth between two domains (an in-focus image and a Fourier domain image) to reduce error at each iteration. It is strongly sensitive to the noise in the latter image. An alternative method is a direct method [11, 12, 13] which exploits the Transport of Intensity Equation (TIE); it is based on first- and higher-order derivatives, and it is not robust to noise. Thus, although the GS and direct methods are computationally efficient, they are both very sensitive to noise.

A few statistical approaches have been proposed as well; an approximation to the maximum likelihood estimator is derived in [2, 14]. However, it easily gets stuck in local maxima, and sometimes leads to poor results. In [1] an augmented complex extended Kalman filter (ACEKF) was used to solve for phase with significant noise corruption.

However, the memory requirements are of order $N^2$ where N is the number of pixels in each intensity image, which is unfeasible for practical image sizes of multiple megapixels, and the long computation times are impractical for real-time applications, such as in biology, biomedical engineering and beyond. In [8] a diagonalized complex extended Kalman filter (diagonalized CEKF) was proposed to alleviate those issues, without jeopardizing the reconstruction accuracy. The diagonalized CEKF is iterative: it needs to cycle through the set of intensity images repeatedly, yielding more accurate phase reconstruction after each cycle. On the other hand, the computational complexity increases with each cycle.

SUMMARY OF THE INVENTION

The present invention aims to provide new and useful methods and apparatus for obtaining phase information concerning a light beam, and in particular a light beam which has interacted with an object to be imaged.

The invention relates to an experimental situation in which an intensity image is collected at each of a plurality of locations spaced apart in a propagation direction of a light beam. Thus, typical embodiments of the invention do not require a reference beam, or rely on interference phenomena. Wavefront propagation means that that plurality of images encode phase information, and the intensity images are used in combination to extract the phase information. The invention proposes in general terms that information from the intensity images is combined using a Kalman filter which assumes that at least one co-variance matrix has a diagonal form. This leads to considerable reduction in computational complexity.

In another aspect, the invention further proposes that an augmented Kalman filter model (augmented space state model) is used in place of the standard Kalman filter model. The augmented Kalman filter improves the robustness to noise.

The result of combining these aspects of the invention is a sparse ACEKF (Sparse augmented complex extended Kalman filter) which can efficiently recover amplitude and phase of an optical field from a series of noisy defocused images. The approach is inspired by [1], which is rooted in statistics and yields reliable phase estimation methods that are robust to noise. However, whereas the ACEKF method of [1] is computationally unwieldy and impractical, preferred embodiments of the present invention are very efficient. The embodiment employs the augmented state space model, and reconstructs the phase by conducting Kalman filtering approximately yet much more efficiently, without losing accuracy in the phase reconstruction. The sparse ACEKF algorithm employs two covariance matrices which are each approximated as a diagonal matrices, or a diagonal matrix multiplied by a permutation matrix. One of these covariance matrices is a pseudo-covariance matrix. For a given matrix A we refer to A* as its "conjugate". The two diagonal covariance matrices, and their conjugates are the four components of a composite covariance matrix. As a result, the phase estimation method is very efficient, and no iterations are needed. It seems to be feasible for phase recovery in real-time, which is entirely unfeasible with ACEKF. In other words, the proposed method provides robust recovery of the phase, while being fast and efficient.

The advantages of preferred embodiments are as follows:

Besides the ordinary bright field image, a phase shift image is created as well. The phase shift image gives quantifiable information about optical distance.

Transparent objects, like living biological cells, are traditionally viewed in a phase contrast microscope or in a differential interference contrast microscope. These methods visualize phase shifting transparent objects by distorting the bright field image with phase shift information. Instead of distorting the bright field image, transmission DHM creates a separate phase shift image showing the optical thickness of the object. Digital holographic microscopy thus makes it possible to visualize and quantify transparent objects and is therefore also referred to as quantitative phase contrast microscopy.

Traditional phase contrast or bright field images of living unstained biological cells have proved themselves to be very difficult to analyze with image analysis software. On the contrary, phase shift images obtained by digital holography and wave propagation methods are readily segmented and analyzed by image analysis software based on mathematical morphology, such as CellProfiler.

The preferred embodiments directly take the noise in the measurement into consideration through the augmented state space model, and therefore, it is robust to strong noise.

The complexity of each iteration in the preferred embodiments of the proposed algorithm is in the order of N log N, where N is the number of pixels per image. The storage required scales linearly with N. In contrast, the complexity of existing statistical phase inference algorithms [1] scales with $N^3$ and the required storage with $N^2$; it literally takes several hours to reconstruct a phase image, which is entirely impractical. Since the preferred embodiment is very fast and achieves phase reconstructions in a fraction of a second, it may enable real-time estimation of optical fields from noisy intensity images. That is required for almost any practical application, since one would want to see the phase reconstruction instantaneously while imaging the object of interest, e.g., a migrating or growing biological cell.

The experimental setup for wave propagation based methods is simpler, compared to the interference methods (phase contrast microscopy, differential interference contrast microscopy, and digital holography microscopy). Fewer optical components are required. It also avoids the phase unwrapping problem associated with those methods. The needed components are inexpensive optics and semiconductor components, such as a laser diode and an image sensor. The low component cost in combination with the auto focusing capabilities of the preferred embodiments, make it possible to manufacture such system for a very low cost.

In summary, the advantages and disadvantages of the various methods are given in Table 1

TABLE 1

| Property | Phase Contrast Microscopy | Digital Holography | Preferred embodiment |
| --- | --- | --- | --- |
| Digital processing | Difficult | Yes | Yes |
| Phase wrapping problem | No | Yes | No |
| Quantitative | No | Yes | Yes |
| Noise resilient | No | No | Yes |
| Experimental set-up | Complicated | Complicated | Simple |
| Real-time imaging | Yes | Potentially | Yes |

BRIEF DESCRIPTION OF THE FIGURES

An embodiment of the invention will now be described for the sake of example only with reference to the following figures, in which:

The patent or application file contains at least one drawing executed in color. Copies of this patent or patent application publication with color drawing(s) will be provided by the Office upon request and payment of the necessary fee.

FIG. 6 is composed of FIG. 6(a) which shows the estimated phase [nm] when the dataset of FIG. 3(c) is processed by ACEKF, diagonalized CEKF, and the embodiment, and FIG. 6(b) which shows the respective depth for each of the images along the black line in FIG. 6(a).

DETAILED DESCRIPTION OF THE EMBODIMENTS

Figure 1:
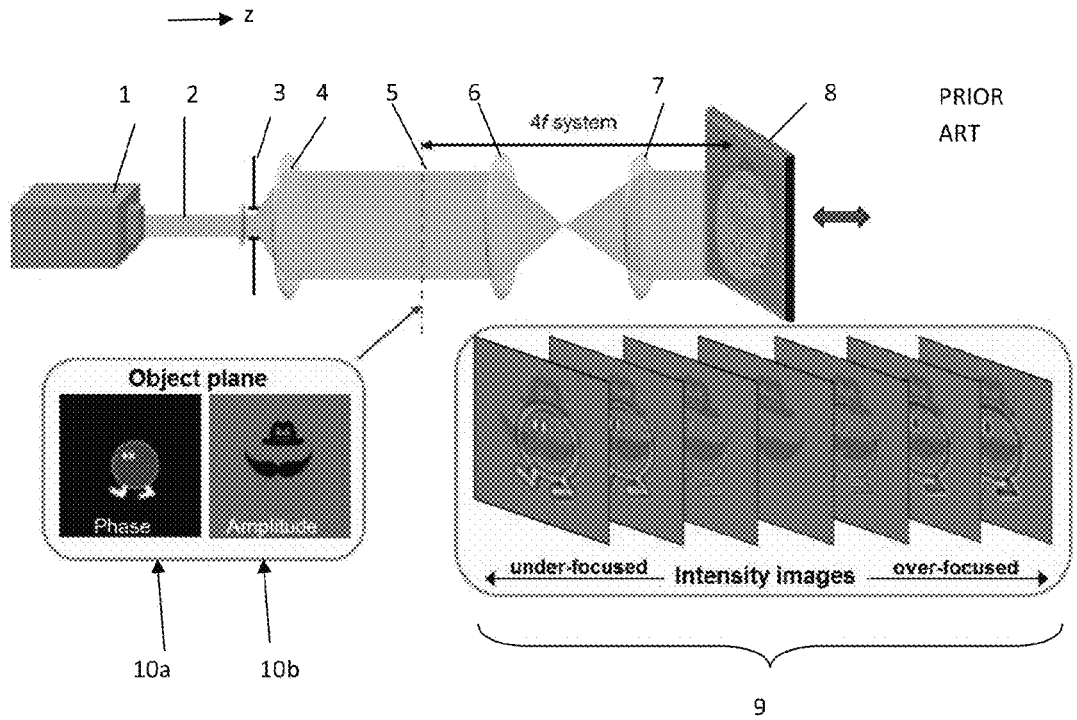
FIG. 1 shows a prior art experimental arrangement which is used in the embodiment.
Figure 2:
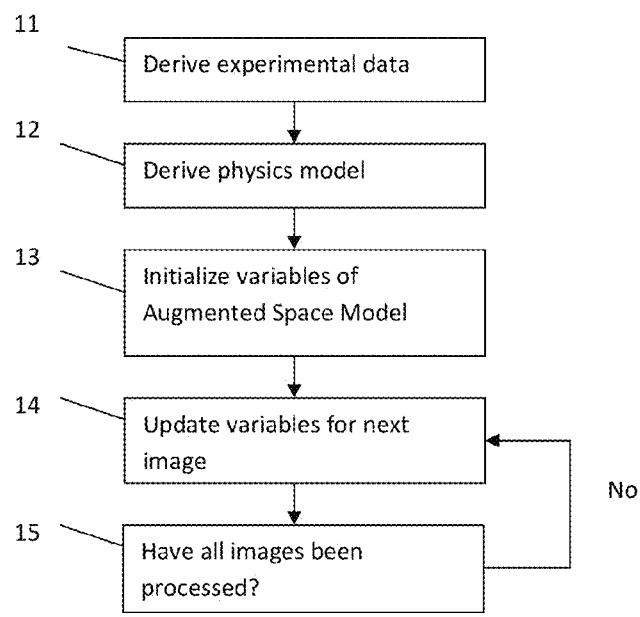
FIG. 2 shows a flow-chart of the steps of the embodiment.

A flow chart of the embodiment is shown in FIG. 2. Step 11 is to set up experimental conditions, such as those in FIG. 1, to collect a series of intensity images in different parallel planes. The images are $M_1 \times M_2$ pixels. Step 12 is to use the parameters of the experimental set-up to generate a physical model describing it. These steps are the same as used, for example, in [1], as described above.

The remaining steps employ a novel augmented state space model. In step 13 parameters of the model are initialised. In step 14, the data for a first of the series of images is used to update the model. As described below this makes use of a novel phase reconstruction algorithm, assuming a diagonal covariance matrix. Step 14 is performed repeatedly for successive ones of the series of images, until all images have been processed.

1. Problem Description and Physical Model

We aim at estimating the 2D complex-field $A(x,y,z_0)$ at the focal plane $z_0$, from a sequence of noisy intensity images $I(x,y,z)$ captured at various distances $z_0, z_1, z_2, \ldots, z_n \ldots, z_N$. In the following explanation it is assumed, for simplicity, that the focal plane $z_0$ is at one end of the series of images, but in fact it is straightforward to generalise this to a situation in which it is in the middle of the set of images (as shown in FIG. 1). We assume a linear medium with homogenous refractive index and coherent (laser) illumination, such that the complex-field at $z_0$ fully determines the complex-field at all other planes. The complex optical field at z is $A(x,y,z)=|A(x,y,z)|e^{i\phi(x,y,z)}$ where $|A(x,y,z)|$ is the intensity, and $\phi(x,y,z)$ is the phase. Propagation is modeled by the homogeneous paraxial wave equation:

$$\frac{\partial A(x,y,z)}{\partial x} = \frac{i\lambda}{4\pi} \nabla_\perp^2 A(x,y,z) \qquad (1)$$

where $\lambda$ is the wavelength of the illumination, and $\nabla_\perp$ is the gradient operator in the lateral (x,y) dimensions. The noisy measurements $I(x,y,z)$ usually adhere to a (continuous) Poisson distribution:

$$p[I(x,y,z)|A(x,y,z)] = e^{-\gamma|A(x,y,z)|^2} \frac{(\gamma|A(x,y,z)|^2)^{I(x,y,z)}}{I(x,y,z)}, \qquad (2)$$

where $\gamma$ is the photon count detected by the camera. The measurement at each pixel $I(x,y,z)$ is assumed statistically independent of any other pixel (conditioned on the optical field $A(x,y,z)$).

2. State Space Model of the Optical Field

We can discretize the optical field $A(x,y,z)$ as a raster-scanned complex column vector $a_n$, and similarly discretize the intensity measurement $I(x,y,z)$ as column vector $I_n$. We denote by $b(u,v,z)$ the 2-D Fourier transform of $A(x,y,z)$. The column vector $b_n$ is again raster-scanned from $b(u,v,z)$, and hence can be expressed as $b_n=Ka_n$, where K where is the discrete Fourier transform matrix. Since K is unitary, we can write $KK^H=K^HK=U$ (with normalization), where U is the identity matrix and $K^H$ denotes the hermitian of K.

We can define the propagation matrix at $z_n$ as [15]:

$$H_n = \mathrm{diag}\left(\exp\left[-i\lambda\pi\left(\frac{u_1^2}{L_x^2}+\frac{v_1^2}{L_y^2}\right)\Delta_n z\right], \ldots, \exp\left[-i\lambda\pi\left(\frac{u_{M_1}^2}{L_x^2}+\frac{v_{M_2}^2}{L_y^2}\right)\Delta_n z\right]\right), \qquad (3)$$

where $L_x$ and $L_y$ are the width and height of the image, respectively. The relation between two images with distance $\Delta_n z$ in the Fourier domain can be written as:

$$b_n = H_n b_{n-1} \qquad (4)$$

We approximate the Poisson observation (2) with a Gaussian distribution of same mean and covariance. In particular, we consider the approximate observation model:

$$I_n = \gamma|a_n|^2 + v \qquad (5)$$

where v is a Gaussian vector with zero mean and covariance $R=\gamma\mathrm{diag}(a^*_n)\mathrm{diag}(a_n)$.

The nonlinear observation model in (5) is linearized as:

$$I_n = \gamma\mathrm{diag}(a^*_n)a_n + v \qquad (6)$$

The embodiment uses an augmented state space model given as:

$$\text{state: } \begin{bmatrix} b_n \\ b_n^* \end{bmatrix} = \begin{bmatrix} H_n & 0 \\ 0 & H_n^* \end{bmatrix}\begin{bmatrix} b_{n-1} \\ b_{n-1}^* \end{bmatrix} \qquad (7)$$

$$\text{observation: } I_n = [J(b_n) \quad J^*(b_n)]\begin{bmatrix} b_n \\ b_n^* \end{bmatrix} + v, \qquad (8)$$

where v is a Gaussian variable with zero mean and covariance R, $$R = \gamma\mathrm{diag}(a_n^*)\mathrm{diag}(a_n) \text{ and } J(b_n) = \frac{1}{2}\gamma\mathrm{diag}(K^T b_n^*)K^H. \qquad (9)$$

3. State Estimation by Sparse ACEKF

The state covariance matrix of the augmented state has the form:

$$S_n = \begin{bmatrix} S_n^Q & S_n^P \\ (S_n^P)^* & (S_n^Q)^* \end{bmatrix} \qquad (10)$$

Here $S_n^Q$ or $S_n^P$ are covariance matrices ($S_n^P$ is in fact a pseudo-covariance matrix). From the update equations of ACEKF [1, 16], we have the following steps:
1. Initialize: $b_0$, $S_0^Q$ and $S_0^P$.
2. Predict: $\hat{b}_n = Hb_{n-1}$, $\hat{S}_n^Q = HS_{n-1}^Q H^H$ and $\hat{S}_n^P = HS_{n-1}^P H^H$
3. Update:

$$S_n^Q = \hat{S}_n^Q - (\hat{S}_n^Q J^H + \hat{S}_n^P J^T)(J\hat{S}_n^Q J^H + J\hat{S}_n^P J^T + J^* (\hat{S}_n^P)^* J^T + J^*(\hat{S}_n^P)^* J^H + R)^{-1}(J\hat{S}_n^Q + J(\hat{S}_n^P)^*) \qquad (11)$$

$$S_n^P = \hat{S}_n^P - (\hat{S}_n^Q J^H + \hat{S}_n^P J^T)(J\hat{S}_n^Q J^H + J\hat{S}_n^P J^* (\hat{S}_n^P)^* J^T + J^* (\hat{S}_n^P)^* J^H + R)^{-1}(J\hat{S}_n^P + J(\hat{S}_n^Q)^*) \qquad (12)$$

$$G_n = (S_n^Q J^H + S_n^P J^T) R^{-1} \quad (13)$$

$$b_n = \hat{b}_n + G_n(I_n - \gamma|a_n|^2) \quad (14)$$

The size of $S_n^Q$ or $S_n^P$, is $N^2$, where N is the number of the pixels in the image. The inversion of the covariance matrix has a computational complexity of $O(N^3)$ in each step. Both the storage requirement and computational burden make the above update algorithm impractical for real applications.

Accordingly, the embodiment makes some constraints and derivations as described below, resulting in a low-complexity algorithm with reduced storage requirement.

After some derivation, we can get Lemma 1 and Theorem 1 and 2.

Lemma 1

If H is diagonal and the diagonal entries of H are rotationally symmetric in 2-D, then EHE=H where $E=KK^T$, and K is the Discrete Fourier Transform Matrix.

Theorem 1

Let us consider how to initialize the covariance matrix $S_0$. First note that a priori one would expect $$S_n^Q = E[b_n b_n^H] = E[K a_n a_n^H K^H] = K E[a_n a_n^H] K^H$$

$$S_n^P = E[b_n b_n^T] = E[K a_n a_n^T K^T] = K E[a_n a_n^T] K^T$$

Here $E[\ldots]$ denotes expectation value. It is assumed that in the complex field every pixel is independently Poisson distributed, we can assume that $E[a_n a_n^T]$ is equal to a scalar times the identity matrix. Thus, the covariance matrix can be initialized as:

$$S_0^Q = Q_0 K K^H = Q_0$$

$$S_0^T = P_0 K K^T = P_0 E$$

where $Q_0$ and $P_0$ are a scalar times the identity matrix. $E=KK^T$ can be shown to be a permutation matrix, and symmetric.

More generally, we write $$S_{n-1}^Q = Q_{n-1}, \text{ and} \quad (15)$$

$$S_{n-1}^P = P_{n-1} E \quad (16)$$

where $Q_{n-1}$ and $P_{n-1}$ are diagonal. The covariance matrix can be updated as follows Predict:

$$\hat{Q}_n = Q_{n-1} \quad (17)$$

$$\hat{P}_n = H P_{n-1} H \quad (18)$$

Update:

$$Q_n = \hat{Q}_n - (\hat{Q}_n + \hat{P}_n)(\hat{Q}_n + \hat{P}_n + (\hat{Q}_n)^* + (\hat{P}_n)^* + qI)^{-1}(\hat{Q}_n + (\hat{P}_n)^*) \quad (19)$$

$$P_n = \hat{P}_n - (\hat{Q}_n + \hat{P}_n)(\hat{Q}_n + \hat{P}_n + (\hat{Q}_n)^* + (\hat{P}_n)^* + qI)^{-1}(\hat{P}_n + (\hat{Q}_n)^*) \quad (20)$$

$$S_n^Q = Q_n \quad (21)$$

$$S_n^P = P_n E \quad (22)$$

where $$q = \frac{1}{0.5^2 \gamma}.$$

Note that $Q_n$ and $P_n$ are diagonal. The covariance matrix $S_n^Q$ and $S_n^P$ has the same form as the covariance $S_{n-1}^Q$ and $S_{n-1}^P$. Therefore once the first covariance matrix are initialized as $S_0^Q = Q_0$ and $S_0^P = P_0 E$, the other matrices in the following steps has the same form.

The proof of theorem 1 requires the assumption that the value of the phase is small so that, defining D by $$D = \frac{1}{2} \gamma \text{diag}(a_n^*)$$

it can be approximated that $D^* D^{-1}$ equals the identity matrix.

Theorem 2

The Kalman gain and update formula for the state are $$G_n = (S_n^Q J^H + S_n^P J^T) R^{-1} = +(Q_n + P_n)(J)^{-1} q \quad (23)$$

$$b_n = \hat{b}_n + G_n(I_n - \gamma|a_n|^2) \quad (24)$$

Using these results, the algorithm presented above can be reformulated as a Sparse augmented complex extended Kalman filter algorithm, used by the embodiment:

(i) Initialization of $b_0$, $Q_0$ and $P_0$.

(ii) Prediction:

$$\hat{b}_n = H b_{n-1} \quad (25)$$

$$\hat{Q}_n = Q_{n-1} \quad (26)$$

$$\hat{P}_n = H P_{n-1} H \quad (27)$$

(iii) Update:

$$\hat{a}_n = K^H \hat{b}_n \quad (28)$$

$$Q_n = \hat{Q}_n - (\hat{Q}_n + \hat{P}_n)(\hat{Q}_n + \hat{P}_n + (\hat{Q}_n)^* + (\hat{P}_n)^* + qI)^{-1}(\hat{Q}_n + (\hat{P}_n)^*) \quad (29)$$

$$P_n = \hat{P}_n - (\hat{Q}_n + \hat{P}_n)(\hat{Q}_n + \hat{P}_n + (\hat{Q}_n)^* + (\hat{P}_n)^* + qI)^{-1}(\hat{P}_n + (\hat{Q}_n)^*) \quad (30)$$

$$b_n = \hat{b}_n + (Q_n + P_n)(J)^{-1} q(I_n - \gamma|a_n|^2)$$

Matrices $Q_n$ and $P_n$ are diagonal, hence they can be stored as two vectors. The storage burden of equations (11), (12) in the update step is reduced from $N^2$ to N. The inverse of J in equation (31) can be computed by a Fast Fourier Transform (FFT). Since $Q_n$ and $P_n$ are diagonal, the matrix multiplications and inversions in equations (29) and (30) have a computational complexity of O(N). The overall computational complexity of the sparse ACEKF is at the scale of $O(N_z N \log(N))$ due to the FFT.

4. Experimental Results of Sparse ACEKF

Three sets of data have been considered to assess the performance the augmented Kalman filter. Data Set 1 consists of 100 images of size 100×100 pixels artificially generated to simulate a complex field propagating from focus in 0.5 µm steps over a distance of 50 µm with illumination wavelength of 532 nm. Pixels are corrupted by Poisson noise so that, on average, each pixel detects γ=0.998 photons.

Data Set 2 comprises 50 images of size 150×150 pixels acquired by a microscope. The wavelength was again 532 nm, and the defocused intensity images were captured by moving the camera axially with a step size of 2 µm over a distance of 100 µm.

Figure 3:
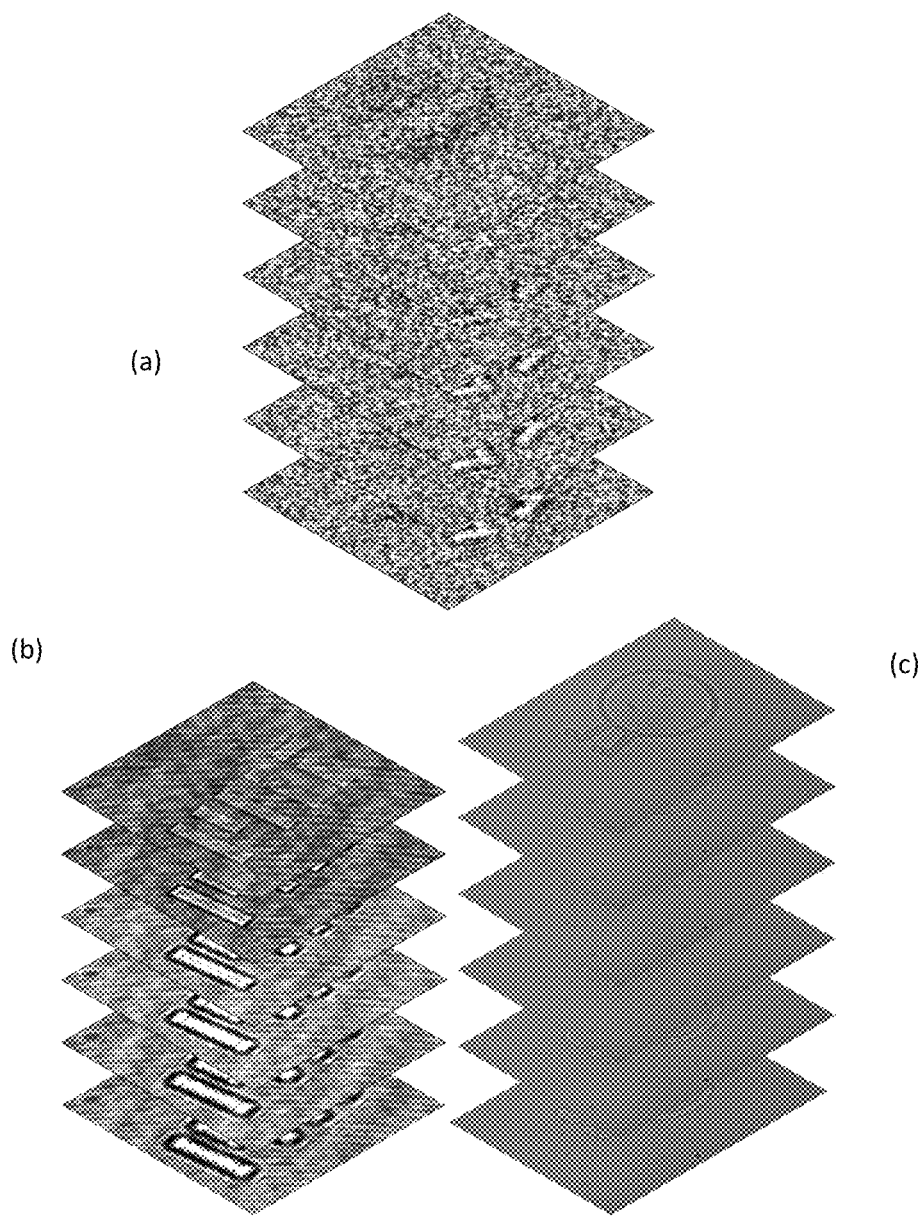
FIG. 3 shows data used in experimental tests of the embodiment, and is composed of FIG. 3(a) which shows simulated images with high noise, FIG. 3(b) which is experimental data acquired by a microscope, and FIG. 3(c) which is experimental data of large size obtained by a microscope.

Data Set 3 has 101 images of size 492×656 pixels acquired by a microscope. The wavelength was 633 nm, and the images were captured by moving the camera axially with a step size of 2 µm. FIG. 3 shows the images of simulated data Data Set 1 (FIG. 3(*a*)) and experimental data Data Set 2 (FIG. 3(*b*)) and Data Set 3 (FIG. 3(*c*)).

4.1 Data Set 1

Figure 4:
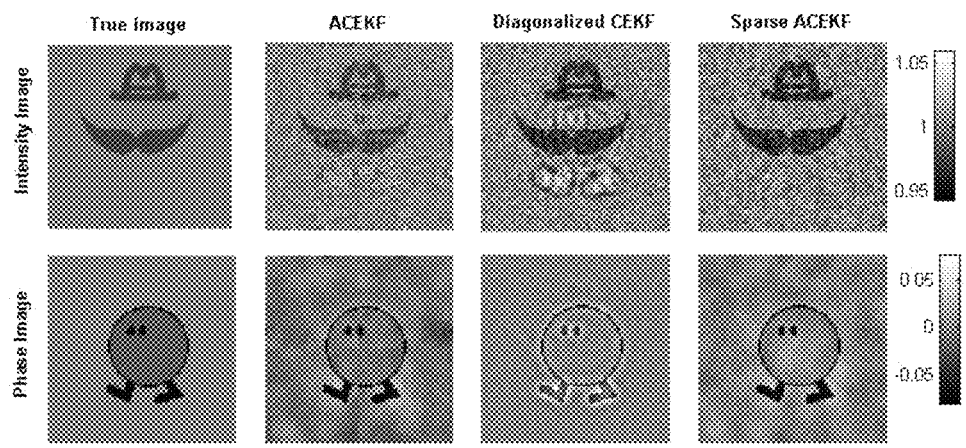
FIG. 4 shows recovered intensity and phase images obtained by processing the dataset of FIG. 3(a) by ACEKF, diagonalized CEKF, and the embodiment.

Table 2 summarizes the results of Data Set 1 using three methods: ACEKF (augmented complex extended Kalman filter) [1], diagonalized CEKF (diagonalized complex extended Kalman filter) [8], and the method sparse ACEKF (Sparse augmented complex extended Kalman filter) used in the embodiment. The ACEKF method has a high computational complexity of $O(N_z N^3)$ and storage requirement of $O(N^2)$. In order to alleviate the computational burden of ACEKF, the images are divided into independent blocks of size 50×50, but it still takes 13562.8 seconds by a general personal computer. On the other hand, the computational complexity of the sparse ACEKF is $O(N_z N \log N)$, and it takes 0.40 seconds to process the 100 (full) images. FIG. 4 shows recovered intensity and phase images obtained by processing the dataset of FIG. 3(a) by ACEKF, diagonalized CEKF, and the embodiment. The results shown are those at the focal plane.

TABLE 2

|  | Complexity | Time[s] | Storage | Intensity error | Phase error [radian] |
|---|---|---|---|---|---|
| ACEKF [1] | $O(N_z N^3)$ | 13562.80 (in block) | $O(N^2)$ | 0.0091 | 0.0139 |
| Diagonalized CEKF [8] | $O(N_z N \log N)$ | 0.30 | $O(N)$ | 0.0079 | 0.0166 |
| Sparse ACEKF (Embodiment) | $O(N_z N \log N)$ | 0.40 | $O(N)$ | 0.0071 | 0.0143 |

As illustrated in Table 2, the computational complexity of the diagonalized CEKF is lower than that of ACEKF. However, the latter yields better results in terms of phase error. In order to reduce the error of the diagonalized CEKF, forward and backward sweeps (iterations) are applied in [8]. However, the iteration increases the computational complexity linearly, and makes the method no longer recursive. The sparse ACEKF method has an intensity error of 0.0071, and a phase error of 0.0143 (radian). Compared with the diagonalized CEKF, the sparse ACEKF has the same computational complexity and storage requirement, but returns lower error images.

The error is here calculated by root mean square error (MSE). However, MSE might not be optimal to evaluate the error. The proposed sparse ACEKF has an error near to ACEKF, while the recovered phase and intensity images of the sparse ACEKF in FIG. 4 might look better. The images recovered by ACEKF exhibit a block effect as straight lines crossing the images, whereas the result of sparse ACEKF is free of this block effect. It is because the sparse ACEKF has a much lower complexity that the embodiment avoids the need to divide the images into independent blocks. The images recovered by ACEKF and the diagonalized CEKF contain traces of phase in the intensity images. However, the trace of phase is almost removed on the estimated intensity image of the sparse ACEKF.

4.2 Experimental Data (Datasets 2 and 3)

Figure 5:
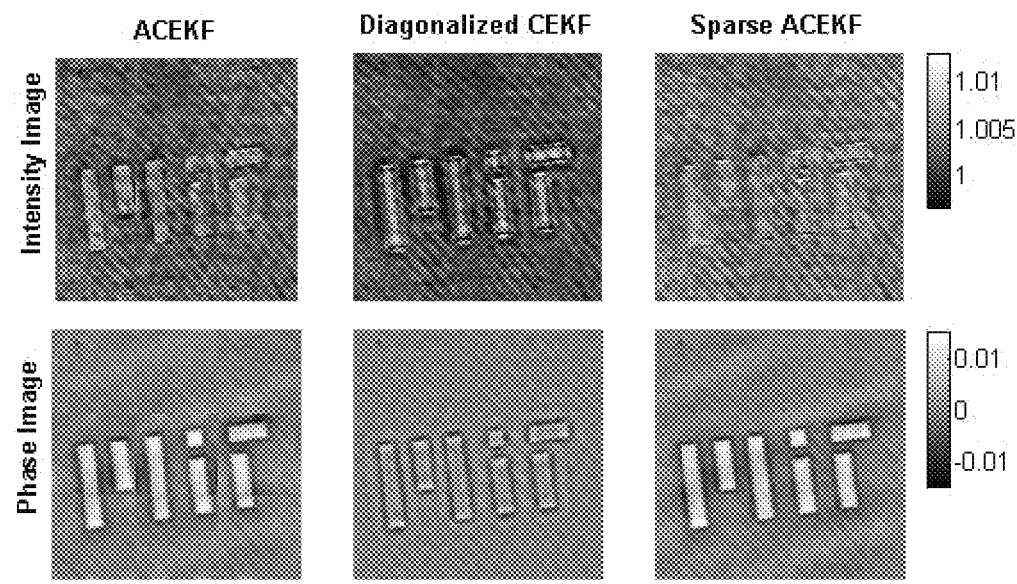
FIG. 5 shows the estimated intensity and phase obtained by processing the dataset of FIG. 3(b) by ACEKF, diagonalized CEKF, and the embodiment.

FIG. 5 compares the estimated intensity image and phase image of Data Set 2 using ACEKF, the diagonalized CEKF, and the sparse ACEKF. Stripes in the phase image recovered by the diagonalized CEKF look darker, while the strips in the recovered phase image of the sparse ACEKF method have stronger contrast. All images are as at the focal plane.

FIG. 6(a) shows the recovered phase [nm] of the Data Set 3 by ACEKF, the diagonalized CEKF, and the sparse ACEKF. The real depth of the sample in Data Set 3 is around 75 nm±5 nm. The proposed embodiment takes 20.24 seconds to process 101 images of size 492×656. However, the ACEKF method takes 54.15 hours and each image is separated into 117 pieces of 50×50 blocks. FIG. 6 (b) compares the depth along the black line in FIG. 6(a). The sparse ACEKF method shows a result much closer to the true value, compared to ACEKF and the diagonalized CEKF.

5. Variations of the Embodiment

There are other state space models for which the concept of a diagonal covariance matrix can be applied. For example, based on (4)-(6) we have a state space model:

State: $b_n = H_n b_{n-1}$;

Observation: $I_n = \gamma \operatorname{diag}(a^*_n) a_n + v$

We can define the follow three steps using a standard Kalman filter [16]:

(1) Initialization: $b_0$ and error covariance matrix, $M_0$.
(2) Prediction: $\hat{b}_n = H b_{n-1}$; $\hat{M}_n = H M_{n-1} H^H$
(3) Update: $G_n = \hat{M}_n J^H (J \hat{M}_n J^H + R)^{-1}$ $$b_n = \hat{b}_n + G_n(I_n - J\hat{b}_n)$$

$$M_n = \hat{M}_n - G_n J \hat{M}_n$$

It can be shown that provided $M_0$ is initialized with a diagonal covariance matrix (specifically $M_0$ is a scalar times U), the state covariance matrix for all n is diagonal. In this case the update procedure becomes simply:

$$\hat{a}_n = K^H \hat{b}_n$$

$$M_n = \alpha_n U \text{ with } \alpha_n = \frac{\alpha_{n-1}}{\gamma \alpha_{n-1} + 1}$$

$$b_n = (1 - \alpha_n \gamma)\hat{b}_n + \alpha_n \gamma J^{-1} I_n$$

The inverse of J can be computed efficiently by means of a Fast Fourier Transform (FFT) algorithm. Both the embodiment described in the previous sections, and this variation, are low-complexity algorithms. As compared the embodiment, this variation takes more iterations to converge, but it has the advantage of being more stable.

6. Commercial Applications

The method could efficiently recover phase and amplitude from a series of noisy defocused images. It is recursive, and feasible for the real time application. The phase from intensity techniques could find applications in areas such as biology and surface profiling. Due to the scalability of the wave equations and the simplicity of the measurement technique, this method could find use in phase imaging beyond optical wavelengths (for example, X-ray or neutron imaging), where high-quality images are difficult to obtain and noise is significant and unavoidable.

Digital holographic microscopy (DHM) has been successfully applied in a range of application areas [5]. However, due to DHM's capability of non-invasively visualizing and quantifying biological tissue, biomedical applications have received most attention. Wave propagation based methods, and the proposed method in particular, may be applied to the same range of applications. Examples of biomedical applications are [5]:

Label-free cell counting in adherent cell cultures. Phase imaging makes it possible to perform cell counting and to measure cell viability directly in the cell culture chamber. Today, the most commonly used cell counting methods, hemocytometer or Coulter counter, only work with cells that are in suspension.

Label-free viability analysis of adherent cell cultures. Phase imaging has been used to study the apoptotic process in different cell types. The refractive index changes taking place during the apoptotic process are easily measured through phase imaging.

Label-free cell cycle analysis. The phase shift induced by cells has been shown to be correlated to the cell dry mass. The cell dry mass can be combined with other parameters obtainable by phase imaging, such as cell volume and refractive index, to provide a better understanding of the cell cycle.

Label-free morphology analysis of cells. Phase imaging has been used in different contexts to study cell morphology using neither staining nor labeling. This can be used to follow processes such as the differentiation process where cell characteristics change. Phase imaging has also been used for automated plant stem cell monitoring, and made it possible to distinguish between two types of stem cells by measuring morphological parameters.

Label free nerve cell studies. Phase imaging makes it possible to study undisturbed processes in nerve cells as no labeling is required. The swelling and shape changing of nerve cells caused by cellular imbalance was easily studied.

Label-free high content analysis. Fluorescent high content analysis/screening has several drawbacks. Label-free alternatives based on phase shift images have therefore been proposed. The capability of phase imaging to obtain phase shift images rapidly over large areas opens up new possibilities of very rapid quantitative characterization of the cell cycle and the effects of specific pharmacological agents.

Red blood cell analysis. Phase shift images have been used to study red blood cell dynamics. Red blood cell volume and hemoglobin concentration has been measured by combining information from absorption and phase shift images to facilitate complete blood cell count by phase imaging. It has furthermore been shown that phase shift information discriminates immature red blood cells from mature, facilitating unstained reticulocyte count.

Flow cytometry and particle tracking and characterization. Phase images are calculated from the recorded intensity images at any time after the actual recording and at any given focal plane. By combining several images calculated from the same intensity images, but at different focal planes, an increased depth of field may be obtained, which is vastly superior to what can be achieved with traditional light microscopy. The increased depth of field makes it possible to image and characterize the morphology of cells and particles while in suspension. Observations may be done directly in a microfluidic channel or statically in an observation chamber.

Time-lapse microscopy of cell division and migration. The autofocus and phase shift imaging capabilities of DHM and the proposed method makes it possible to effortlessly create label-free and quantifiable time-lapse video clips of unstained cells for cell migration studies.

Tomography studies. Phase imaging allows for label-free and quantifiable analysis of subcellular motion deep in living tissue.

REFERENCES

[1] L. Waller, M. Tsang, S. Ponda, S. Yang, and G. Barbastathis, "Phase and amplitude imaging from noisy images by Kalman filtering," Optics Express 19, 2805-2814 (2011).

[2] R. Paxman, T. Schulz, and J. Fienup. "Joint estimation of object and aberrations by using phase diversity", J. Opt. Soc. Am. A, 9(7):1072-1085, 1992.

[3] Phase contrast microscopy, http://en.wikipedia.org/wiki/Phase_contrast_microscopy

[4] Differential interference contrast microscopy. http://en.wikipedia.org/wiki/Differential_interference_contrast_microscopy

[5] Digital holographic microscopy, http://en.wiipedia.org/wiki/Digital_holographic_microscopy.

[6] J. M. Huntley, "Phase Unwrapping: Problems and Approaches", Proc. FASIG, Fringe Analysis 94. York University, 391-393, 1994a.

[7] M. Takeda, "Recent Progress in Phase-Unwrapping Techniques", Proc. SPIE, 2782:334-343, 1996.

[8] Zhong Jingshan, Justin Dauwels, Manuel A. Vazquez, Laura Waller. "Efficient Gaussian Inference Algorithms for Phase Imaging", Proc. IEEE ICASSP, 617-620, 2012.

[9] R. Gerchberg and W. Saxton, "A practical algorithm for the determination of phase from image and diffraction plane picture", Optik, 35:273-246, 1972.

[10] J. Fienup, "Phase retrieval algorithms: a comparison", Appl. Opt., 21, 1982.

[11] M. Teague, "Deterministic phase retrieval: a Green's function solution", J. Opt. Soc. Am. A, 73(11):1434, 1983.

[12] M. Soto and E. Acosta, "Improved phase imaging from intensity measurements in multiple planes", Appl. Opt., 46(33):7978-7981, 2007.

[13] L. Waller, L. Tian, and G. Barbastathis. "Transport of intensity phase-amplitude imaging with higher order intensity derivatives", Opt. Express, 18(12):12552-12561, 2010.

[14] R. Paxman and J. Fienup. "Optical misalignment sensing and image reconstruction using phase diversity", J. Opt. Soc. Am. A, 5(6):914-923, 1988.

[15] J. Goodman, Introduction to Fourier Optics, McGraw-Hill.

[16] R. Kalman et al., "A new approach to linear filtering and prediction problems", J. basic Eng., 82(1): 35-45, 1960.

The invention claimed is:

1. A method for deriving information about a propagating electromagnetic beam, the method employing a plurality of intensity images captured at parallel spaced apart planes at respective positions along a propagation path of the beam, the method comprising:
   (a) initializing parameters of a state space model, the parameters including at least a covariance matrix initialized with a diagonal matrix; and
   (b) for successive ones of the intensity images, using the previously generated parameters and the intensity image to produce new parameters giving a successively improved description of the propagating electromagnetic beam, the new parameters including at least one covariance matrix which is a diagonal matrix;
   wherein the parameters include the covariance matrix and a pseudo-covariance matrix, and both of the covariance matrix and the pseudo-covariance matrix are initialized with diagonal matrices.

2. A method according to claim 1 in which the state space model is an augmented space state model employing a composite covariance matrix composed of said diagonal covariance matrix and said pseudo-covariance matrix, said pseudo-covariance matrix being initialized by multiplying a diagonal matrix by a permutation matrix E, and their conjugates.

3. A method according to claim 1 in which the images comprise $M_1 \times M_2$ pixels and are spaced apart by a distance $\Delta_n z$, and, labelling the images by index n, the electromagnetic field at pixels of the n-th image is described by complex column vector $a_n$, the intensity of pixels of the n-th image are described by column vector $I_n$, the 2-D Fourier transform of the electromagnetic field is described by the column vector $b_n$, the propagation matrix is $$H_n = \text{diag}\left(\exp\left[-i\lambda\pi\left(\frac{u_1^2}{L_x^2} + \frac{v_1^2}{L_y^2}\right)\Delta_n z\right], \ldots, \exp\left[-i\lambda\pi\left(\frac{u_{M_1}^2}{L_x^2} + \frac{v_{M_2}^2}{L_y^2}\right)\Delta_n z\right]\right)$$

where $L_x$ and $L_y$ are the width and height of the image, respectively, and the state space model is an augmented space state model given by:

state: $\begin{bmatrix} b_n \\ b_n^* \end{bmatrix} = \begin{bmatrix} H_n & 0 \\ 0 & H_n^* \end{bmatrix} \begin{bmatrix} b_{n-1} \\ b_{n-1}^* \end{bmatrix}$ observation: $I_n = [J(b_n) \quad J^*(b_n)] \begin{bmatrix} b_n \\ b_n^* \end{bmatrix} + v$, where v is a Gaussian variable with zero mean and covariance R, where $R = \gamma \text{diag}(a_n^*)\text{diag}(a_n)$, $$J(b_n) = \frac{1}{2}\gamma \text{diag}(K^T b_n^*)K^H,$$

K is the discrete Fourier transform matrix and $K^H$ denotes the hermitian of K.

4. A method according to claim 3 which employs a state covariance matrix in the form:

$$S_n = \begin{bmatrix} S_n^Q & S_n^P \\ (S_n^P)^* & (S_n^Q)^* \end{bmatrix};$$

(a) is performed by initializing parameters $b_0$, $S_0^Q$ and $S_0^P$; and
(b) is performed by, for each successive n-th image, implementing the equations:

$\hat{S}_n^Q = HS_{n-1}^Q H^H$ and $\hat{S}_n^P = HS_{n-1}^P H^H$ $S_n^Q = \hat{S}_n^P - (\hat{S}_n^Q J^H + \hat{S}_n^P J^T)(J\hat{S}_n^Q J^H + J\hat{S}_n^P J^*(\hat{S}_n^Q)^* J^T + J^*(\hat{S}_n^P)^* J^H + R)^{-1}(J\hat{S}_n^Q + J(\hat{S}_n^P)^*)$ $S_n^P = \hat{S}_n^P - (\hat{S}_n^Q J^H + \hat{S}_n^P J^T)(J\hat{S}_n^Q J^H + J\hat{S}_n^P J^*(\hat{S}_n^Q)^* J^T + J^*(\hat{S}_n^P)^* J^H + R)^{-1}(J\hat{S}_n^P + J(\hat{S}_n^Q)^*)$ $G_n = (S_n^Q J^H + S_n^P J^T)R^{-1}$ and $b_n = \hat{b}_n + G_n(I_n - \gamma|a_n|^2)$.

5. A method according to claim 4 in which the state covariance matrix is in the form:

$$S_n = \begin{bmatrix} S_n^Q & S_n^P \\ (S_n^P)^* & (S_n^Q)^* \end{bmatrix};$$

and, using diagonal matrices $Q_{n-1}$ and $P_{n-1}$ according to:

$S_{n-1}^Q = Q_{n-1}$, and $S_{n-1}^P = P_{n-1}E$ step (a) is performed by initializing $b_0$, $Q_0$ and $P_0$; and
step (b) is performed by evaluating:

$\hat{b}_n = Hb_{n-1}$ $\hat{Q}_n = Q_{n-1}$ $\hat{P}_n = HP_{n-1}H$ $\hat{a}_n = K^H \hat{b}_n$ $Q_n = \hat{Q}_n - (\hat{Q}_n + \hat{P}_n)(\hat{Q}_n + \hat{P}_n + (\hat{Q}_n)^* + (\hat{P}_n)^* + qI)^{-1}(\hat{Q}_n + (\hat{P}_n)^*)$ $P_n = \hat{P}_n - (\hat{Q}_n + \hat{P}_n)(\hat{Q}_n + \hat{P}_n + (\hat{Q}_n)^* + (\hat{P}_n)^* + qI)^{-1}(\hat{P}_n + (\hat{Q}_n)^*)$ and $b_n = \hat{b}_n + (Q_n + P_n)(J)^{-1}q(I_n - \gamma|a_n|^2)$.

6. A computer system having a processor and a non-transitory data storage device storing program instructions, the program instructions operative, when implemented by the processor, to derive information about a propagating electromagnetic beam from a plurality of intensity images captured at parallel spaced apart planes at respective positions along a propagation path of the beam, the program instructions being operative to cause the processor to:
initialize parameters of a state space model, the parameters including at least a covariance matrix initialized with a diagonal matrix;
for successive ones of the intensity images, to use the previously generated parameters and the intensity image to produce new parameters giving a successively improved description of the propagating electromagnetic beam, the new parameters including at least one covariance matrix which is a diagonal matrix;
wherein the parameters include the covariance matrix and a pseudo-covariance matrix, and both of the covariance matrix and the pseudo-covariance matrix are initialized with diagonal matrices.

7. A method for deriving information about a propagating electromagnetic beam, the method employing a plurality of intensity images captured at parallel spaced apart planes at respective positions along a propagation path of the beam, the method comprising:
initializing parameters of a state space model, the parameters including at least a covariance matrix initialized with a diagonal matrix; and
for successive ones of the intensity images, using the previously generated parameters and the intensity image to produce new parameters giving a successively improved description of the propagating electromagnetic beam, the new parameters including at least one covariance matrix which is a diagonal matrix;
wherein the images comprise $M_1 \times M_2$ pixels and are spaced apart by a distance $\Delta_n z$, and, labelling the images by index n, the electromagnetic field at pixels of the n-th image is described by complex column vector $a_n$, the intensity of pixels of the n-th image are described by column vector $I_n$, the 2-D Fourier transform of the electromagnetic field is described by the column vector $b_n$, the propagation matrix is:

$$H_n = \text{diag}\left(\exp\left[-i\lambda\pi\left(\frac{u_1^2}{L_x^2} + \frac{v_1^2}{L_y^2}\right)\Delta_n z\right], \ldots, \exp\left[-i\lambda\pi\left(\frac{u_{M_1}^2}{L_x^2} + \frac{v_{M_2}^2}{L_y^2}\right)\Delta_n z\right]\right)$$

where $L_x$ and $L_y$ are the width and height of the image, respectively, and the state space model is an augmented space state model given by:

$$\text{state: } \begin{bmatrix} b_n \\ b_n^* \end{bmatrix} = \begin{bmatrix} H_n & 0 \\ 0 & H_n^* \end{bmatrix} \begin{bmatrix} b_{n-1} \\ b_{n-1}^* \end{bmatrix}$$

$$\text{observation: } I_n = [J(b_n) \quad J^*(b_n)] \begin{bmatrix} b_n \\ b_n^* \end{bmatrix} + v,$$

where v is a Gaussian variable with zero mean and covariance R, where $R=\gamma \text{diag}(a^*_n)\text{diag}(a_n)$, $$J(b_n) = \frac{1}{2}\gamma \text{diag}(K^T b_n^*) K^H,$$

K is the discrete Fourier transform matrix and $K^H$ denotes the hermitian of K.

8. A computer system having a processor and a non-transitory data storage device storing program instructions, the program instructions operative, when implemented by the processor, to derive information about a propagating electromagnetic beam from a plurality of intensity images captured at parallel spaced apart planes at respective positions along a propagation path of the beam, the program instructions being operative to cause the processor to:
initialize parameters of a state space model, the parameters including at least a covariance matrix initialized with a diagonal matrix;
for successive ones of the intensity images, to use the previously generated parameters and the intensity image to produce new parameters giving a successively improved description of the propagating electromagnetic beam, the new parameters including at least one covariance matrix which is a diagonal matrix;

wherein the images comprise $M_1 \times M_2$ pixels and are spaced apart by a distance $\Delta_n z$, and, labelling the images by index n, the electromagnetic field at pixels of the n-th image is described by complex column vector $a_n$, the intensity of pixels of the n-th image are described by column vector $I_n$, the 2-D Fourier transform of the electromagnetic field is described by the column vector $b_n$, the propagation matrix is:

$$H_n = \text{diag}\left(\exp\left[-i\lambda\pi\left(\frac{u_1^2}{L_x^2} + \frac{v_1^2}{L_y^2}\right)\Delta_n z\right], \ldots, \exp\left[-i\lambda\pi\left(\frac{u_{M_1}^2}{L_x^2} + \frac{v_{M_2}^2}{L_y^2}\right)\Delta_n z\right]\right)$$

where $L_x$ and $L_y$ are the width and height of the image, respectively, and the state space model is an augmented space state model given by:

$$\text{state: } \begin{bmatrix} b_n \\ b_n^* \end{bmatrix} = \begin{bmatrix} H_n & 0 \\ 0 & H_n^* \end{bmatrix} \begin{bmatrix} b_{n-1} \\ b_{n-1}^* \end{bmatrix}$$

$$\text{observation: } I_n = [J(b_n) \quad J^*(b_n)] \begin{bmatrix} b_n \\ b_n^* \end{bmatrix} + v,$$

where v is a Gaussian variable with zero mean and covariance R, where $R=\gamma \text{diag}(a^*_n)\text{diag}(a_n)$, $$J(b_n) = \frac{1}{2}\gamma \text{diag}(K^T b_n^*) K^H,$$

K is the discrete Fourier transform matrix and $K^H$ denotes the hermitian of K.

* * * * *